United States Patent
Cumberland et al.

(10) Patent No.: US 7,732,497 B2
(45) Date of Patent: Jun. 8, 2010

(54) COLLOIDAL PARTICLES FOR LOTUS EFFECT

(75) Inventors: Scott Cumberland, Pleasanton, CA (US); Ashot Serobian, Martinez, CA (US); Jodi Russell, Castro Valley, CA (US); Danielle Nguyen, Dublin, CA (US)

(73) Assignee: The Clorox Company, Oakland, CA (US)

( * ) Notice: Subject to any disclaimer, the term of this patent is extended or adjusted under 35 U.S.C. 154(b) by 264 days.

(21) Appl. No.: 11/695,301

(22) Filed: Apr. 2, 2007

(65) Prior Publication Data

US 2008/0241408 A1 Oct. 2, 2008

(51) Int. Cl.
  *C01B 33/152* (2006.01)
(52) U.S. Cl. .................... 516/111; 427/397.7
(58) Field of Classification Search ............. 516/111
  See application file for complete search history.

(56) References Cited

U.S. PATENT DOCUMENTS

| | | | |
|---|---|---|---|
| 5,204,088 | A | 4/1993 | Noebel et al. |
| 6,478,864 | B1 | 11/2002 | Field |
| 6,635,735 | B1 | 10/2003 | Zhang et al. |
| 6,706,798 | B2 | 3/2004 | Kobayashi et al. |
| 6,811,856 | B2 | 11/2004 | Nun et al. |
| 6,852,389 | B2 | 2/2005 | Nun et al. |
| 6,858,284 | B2 | 2/2005 | Nun et al. |
| 6,997,018 | B2 | 2/2006 | Sakoske et al. |
| 7,083,828 | B2 | 8/2006 | Muller et al. |
| 2002/0016433 | A1 | 2/2002 | Keller et al. |
| 2002/0107316 | A1 | 8/2002 | Bice et al. |
| 2002/0150723 | A1 | 10/2002 | Oles et al. |
| 2002/0170690 | A1 | 11/2002 | Buchsel et al. |
| 2003/0108716 | A1* | 6/2003 | Nun et al. .................. 428/141 |
| 2003/0134035 | A1 | 7/2003 | Lamb et al. |
| 2003/0147932 | A1 | 8/2003 | Nun et al. |
| 2005/0103457 | A1 | 5/2005 | Nun et al. |
| 2005/0113936 | A1 | 5/2005 | Brustad et al. |
| 2005/0186872 | A1 | 8/2005 | Wang et al. |
| 2005/0186873 | A1 | 8/2005 | Wang et al. |
| 2005/0245633 | A1 | 11/2005 | Soutar et al. |
| 2006/0110541 | A1* | 5/2006 | Russell et al. ............ 427/372.2 |
| 2006/0147675 | A1 | 7/2006 | Nun et al. |
| 2007/0009709 | A1 | 1/2007 | Krishnan et al. |
| 2007/0249736 | A1* | 10/2007 | Watanabe et al. ............ 516/81 |

FOREIGN PATENT DOCUMENTS

| | | |
|---|---|---|
| EP | 0909747 | 4/1999 |
| EP | 0933388 | 10/2002 |
| EP | 0832947 | 5/2003 |
| WO | WO2004/037944 | 5/2004 |
| WO | WO 2004/090065 | 10/2004 |

OTHER PUBLICATIONS

Gun'ko et al., "Mechanism and kinetics of hexamethyldisilazane reaction with a fumed silica surface," *Journal of Colloid and Interface Science*, vol. 288, pp. 157-170 (2000).

* cited by examiner

*Primary Examiner*—Ling-Siu Choi
*Assistant Examiner*—Chun-Cheng Wang
(74) *Attorney, Agent, or Firm*—Erin Collins (57) ABSTRACT

A composition formulated to form a non-smooth surface on a substrate surface at least after the composition has been applied to the substrate and has substantially dried or set. The composition including a first and second set of colloidal particles. Each of the first and second sets of colloidal particles includes a plurality of colloidal particles. The first set of colloidal particles can have an average particle size that is greater than the average size of the second set of particles. The number of colloidal particles in the second set of colloidal particles can be greater than the number of colloidal particles in the first set of colloidal particles. One or more of the colloidal particles can be modified to include one or more hydrocarbon chains.

12 Claims, 1 Drawing Sheet

COLLOIDAL PARTICLES FOR LOTUS EFFECT

The present invention relates to liquid repelling and/or stain resistant surfaces, more particularly to treated surfaces that exhibit resistance to liquid absorption and/or stain resistance, and even more particularly to a paste, a liquid or an aerosol product that includes colloidal particles that can impart liquid repellent and/or stain resistance properties to various types of materials.

BACKGROUND OF THE INVENTION

For many types of products, it is desirable to form a hydrophobic surface. This hydrophobic surface can be used to improve the liquid repellence of the product and/or stain resistance of the product. Products with surfaces which resist absorbing liquids can have a number of commercially beneficial features. Such features can include, but are not limited to, liquid repellent materials and/or liquid resistant finishes (e.g., waterproof/water repellent clothing and/or fabrics, wood finishes, leather and/or suede coatings and/or finishes, etc.), self-cleaning finishes and/or finishes that have a self cleaning effect (e.g., window pane finishes, windshield finishes, vehicle finishes, tire finishes, outdoor equipment finishes, etc.), and/or stain resistance finishes (e.g., furniture and/or carpet finishes, leather and/or suede finishes, fabric finishes, hard surface finishes, etc.).

The mechanisms associated with liquid repellency and liquid adhesion are in part related to the surface-energy acting between the liquid and the surface in contact with the liquid. When the free surface energy between the surface and liquid are low, there is generally a weak bond or adhesion between the liquid and surface. In such situations, the liquid has a greater tendency to run off the surface and/or be adsorbed at a slower rate by the surface. As such, on such surfaces liquids tend to runoff non-flat surfaces and/or bead on flatter surfaces.

Hydrophobic materials are commonly used to form hydrophobic surfaces. Such materials include waxes, fluorinated polymers, silicones, and the like. These materials are used in vehicle waxes and/or cleaners, tire cleaners, leather polishes and/or cleaners, floor polishes and/or cleaners, etc. For instance, silicones, siloxanes and various fluoro-acrylate polymers are the predominant materials used in fabric water proofing formulations and have been used for many years to protect fabrics from moisture penetration. These formulations are generally sprayed topically onto a fabric surface, and after air curing or drying, provide effective water repellency to rain, moisture, as well as protection against various soils and stains.

Another mechanism for forming hydrophobic surfaces is by altering the topology of the surface of a material. It has been found that elevations or depressions having certain heights and separated by certain distances can create hydrophobic surfaces. These types of surfaces can result in droplet formation of liquids. This principle is borrowed from nature and specifically from the lotus plant. It is known that small contact surfaces can reduce Van der Waals interaction, which is in part responsible for adhesion to flat surfaces with low surface energy. The leaves of the lotus plant have elevations made from a wax, and these elevations tend to lower the contact area with water. Several patent applications disclose the use of these artificially formed elevations on various types of surfaces such as US 2002/0150723; US 2003/0108716 and WO 00/58410, all of which are incorporated herein by reference.

The present invention is directed to an improved product including colloidal particles that can be used on a variety of surfaces to form small elevations and depressions to form a liquid repellent and/or liquid proof surface which inhibits or prevents absorption/adsorption of liquids on the treated surface, and/or to inhibit or prevents staining of the treated surface.

SUMMARY OF THE INVENTION

The present invention relates to liquid repelling and/or stain resistant surfaces, more particularly to treated surfaces that exhibit resistance to liquid absorption and/or exhibit stain resistance, and even more particularly to a solid (e.g., paste, wax, etc.), a liquid or an aerosol product that includes colloidal particles that can impart liquid repellant and/or stain resistance properties to various types of materials. It has been found that colloidal particles can be used to modify the surface that has been coated with the colloidal particle containing composition of the present invention. For instance, the colloidal particles can be used to 1) fill scratched and/or other types of damaged and/or uneven surfaces, 2) improve the hardness and/or durability of a coating on a surface, 3) create a hydrophilic coated surface, and/or 4) create a hydrophobic coated surface. As can be appreciated, the colloidal particles can have other or different functions. The inclusion of at least two colloidal particles having a different size is believed to form elevations and depressions on a material upon which these particles have been deposited. As can be appreciated, these colloidal particles can be applied to different types of materials by a variety of mechanisms. For instance, when the colloidal particles are applied to hard surfaces (e.g., glass surfaces, tile surfaces, granite surfaces, formica surfaces, linoleum surfaces, concrete or concrete composite surfaces, metal surfaces, wood surfaces, ceramic surfaces, etc.), the colloidal particles can be applied by a solid solution (e.g., wax, paste, etc.), a liquid solution, and/or by an aerosol. When it is desired to apply the colloidal particles to a non-hard surface (e.g., fabric surfaces, leather surfaces, carpet, woven or non-woven materials, etc.); the solid colloidal particles can be applied by a solid solution, a liquid solution, and/or by an aerosol. Non-limiting examples of surfaces that the colloidal particles can be applied in accordance with the present invention include, but are not limited to, counter tops, windows, appliances, hard floors, rugs, tubs, showers, mirrors, toilets, bidets, bathroom fixtures, sinks, refrigerators, microwaves, small kitchen appliances, tables, chairs, cabinets, drawers, sofas, love seats, benches, beds, stools, armoires, chests, dressers, display cabinets, clocks, buffets, shades, shutters, entertainment centers, arm rails, lamps, banisters, libraries, cabinets, desks, doors, shelves, couches, carts, pianos, statues and other art, racks, fans, light fixtures, pool tables, ping pong tables, soccer tables, card tables, tools (e.g., hand powered and/or hand held tools, electrical tools, air powered tools, etc.), telephones, radios, televisions, stereo equipment, CD and DVD players, analog and digital sound devices, palm computers, laptop computers, desktop and tower computers, computer monitors, mp3 players, memory storage devices, cameras, camcorders, vehicle surfaces (e.g., windshield; tires; metal, fiberglass, composite material and/or plastic outer surfaces; fabric and/or vinyl outer surfaces; fabric, vinyl, and/or leather interior surfaces; metal, plastic, wood and/or composite material interior surfaces, glass interior surfaces, etc.), bicycles, snowmobiles, motorcycles, off-road-vehicles, yard equipment, farm equipment, washing equipment (e.g., power washers, etc.), painting equipment (e.g., electric and air powered painting equipment, etc.), medical and/or dental equipment, marine equipment (e.g., sail boats, power boats, rafts, sail board, canoe, row boats, etc.), toys, writing implements, watches, framed pictures or paintings, books, and/or the like. In essence, any surface where it is desirable to cause one or more types of liquids 1) to run off of a surface, 2) to not be absorbed into a surface, and/or 3) to not stain a surface, can have the colloidal particles of the present invention applied to such surfaces.

In one non-limiting aspect of the present invention, the colloidal particle containing composition of the present invention contains at least two different sized colloidal particles. It is believed that the differing sized colloidal particles, when applied to a surface, result in the colloidal particles stacking on top of one another to form non-smooth surfaces. These non-smooth surfaces are believed to be at least partially caused by the non-uniform particle sizes of the colloidal particles. In one non-limiting embodiment of the present invention, the non-smooth surfaces generally have an average height between the valleys and peaks of the non-smooth surfaces of up to about 1500 nm; however, it can be appreciated that larger average heights can be achieved. In one non-limiting example, the average height between the valleys and peaks of the non-smooth surfaces is about 1-500 nm. In another non-limiting example, the average height between the valleys and peaks of the non-smooth surfaces is about 1-100 nm. In still another non-limiting example, the average height between the valleys and peaks of the non-smooth surfaces is about 5-80 nm. In yet another non-limiting example, the average height between the valleys and peaks of the non-smooth surfaces is 10-60 nm. In still yet another non-limiting example, the average height between the valleys and peaks of the non-smooth surfaces is 30-40 nm. These small elevations and depressions on the surface of a material can at least partially result in a lotus effect on the surface of the material. As such, liquids (e.g., water, etc.) that contact a surface that includes these small elevations and depressions have a tendency to runoff such surfaces, thereby reducing the opportunity of such liquids to be absorbed into such surfaces and/or dry on and stain such surfaces. In another and/or alternative non-limiting embodiment of the invention, the particle size ratio of at least two sized sets of colloidal particles in the colloidal particle containing composition of the present invention is at least about 1.02:1. In one non-limiting aspect of this embodiment, the average size ratio of at least two different sized colloidal particles is at least about 1.05:1. In another non-limiting aspect of this embodiment, the average size ratio of at least two different sized colloidal particles is at least about 1.1:1. In another non-limiting aspect of this embodiment, the average size ratio of at least two different sized colloidal particles is at least about 1.5:1. In still another non-limiting aspect of this embodiment, the average size ratio of at least two different sized colloidal particles is at least about 2:1. In yet another non-limiting aspect of this embodiment, the average size ratio of at least two different sized colloidal particles is about 2-20:1. In still yet another non-limiting aspect of this embodiment, the average size ratio of at least two different sized colloidal particles is about 2-10:1. In still yet another non-limiting aspect of this embodiment, the average size ratio of at least two different sized colloidal particles is about 2.5-8:1. In another non-limiting aspect of this embodiment, the average size ratio of at least two different sized colloidal particles is about 3-7:1. In still another non-limiting aspect of this embodiment, the average size ratio of at least two different sized colloidal particles is about 5-7:1. In yet another non-limiting aspect of this embodiment, the average size ratio of at least two different sized colloidal particles is about 3-5:1. As can be appreciated, other size ratios can be used. In another and/or alternative one non-limiting embodiment of the invention, the number of colloidal particles that are included in each set of sized colloidal particles is controlled to obtain the desired non-smooth surfaces on the surface of a material that is coated with the colloidal particle containing composition of the present invention. Generally, the number of small colloidal particles in the colloidal particle containing composition of the present invention is greater than the number of larger colloidal particles. In one non-limiting aspect of this embodiment, the ratio of the number of small colloidal particles of at least one set of colloidal particles having some average size to the number of larger colloidal particles in at least one other set of colloidal particles having some average size is at least about 1.5:1. In yet another non-limiting aspect of this embodiment, the ratio of the number of small colloidal particles of at least one set of colloidal particles having some average size to the number of larger colloidal particles in at least one other set of colloidal particles having some average size is at least about 2:1. In still another non-limiting aspect of this embodiment, the ratio of the number of small colloidal particles of at least one set of colloidal particles having some average size to the number of larger colloidal particles in at least one other set of colloidal particles having some average size is at least about 5:1. In still another non-limiting aspect of this embodiment, the ratio of the number of small colloidal particles of at least one set of colloidal particles having some average size to the number of larger colloidal particles in at least one other set of colloidal particles having some average size is at least about 10:1. In yet another non-limiting aspect of this embodiment, the ratio of the number of small colloidal particles of at least one set of colloidal particles having some average size to the number of larger colloidal particles in at least one other set of colloidal particles having some average size is at least about 20:1. In still yet another non-limiting aspect of this embodiment, the ratio of the number of small colloidal particles of at least one set of colloidal particles having some average size to the number of larger colloidal particles in at least one other set of colloidal particles having some average size is about 10-1000:1. In another non-limiting aspect of this embodiment, the ratio of the number of small colloidal particles of at least one set of colloidal particles having some average size to the number of larger colloidal particles in at least one other set of colloidal particles having some average size is about 15-500:1. In still another non-limiting aspect of this embodiment, the ratio of the number of small colloidal particles of at least one set of colloidal particles having some average size to the number of larger colloidal particles in at least one other set of colloidal particles having some average size is about 20-300:1. In yet another non-limiting aspect of this embodiment, the ratio of the number of small colloidal particles of at least one set of colloidal particles having some average size to the number of larger colloidal particles in at least one other set of colloidal particles having some average size is about 30-200:1. In still yet another non-limiting aspect of this embodiment, the ratio of the number of small colloidal particles of at least one set of colloidal particles having some average size to the number of larger colloidal particles in at least one other set of colloidal particles having some average size is about 70-150:1. As can be appreciated, other number of particle ratios can be used. In still yet another and/or alternative non-limiting embodiment of the present invention, the colloidal particle containing composition of the present invention can have a controlled maximum average size of colloidal particles in the colloidal particle containing composition of the present invention so as to achieve one or more of the desired properties of the colloidal particle containing composition. For instance, when the colloidal particle containing composition is to be used on a glass surface and/or is used to form a substantially transparent coating, the maximum size of the colloidal particles is generally below 1000 nm, since larger particle colloidal particles can cause the coating to be cloudy and/or colored. In other applications wherein clear coatings are not essential, colloidal particles can have a size that is less than, equal to, or greater than about 1000 nm. In one non-limiting specific example, the colloidal particle containing composition of the present invention does not include colloidal particles that are greater than about 25000 nm. In another one non-limiting specific example, the colloidal particle containing composition of the present invention includes a maximum set size of colloidal particles that has an average size of less than about 5000 nm. In still another one non-limiting specific example, the colloidal particle containing composition of the present invention includes a maximum set size of colloidal particles that has an average size of less than about 2000 nm. In yet another one non-limiting specific example, the colloidal particle containing composition of the present invention includes a maximum set size of colloidal particles that has an average size of less than about 500 nm. In still yet another one non-limiting specific example, the colloidal particle containing composition of the present invention includes one set of colloidal particles having an average size of about 2-40 nm and a second set of colloidal particles having an average size of about 15-200 nm. In another one non-limiting specific example, the colloidal particle containing composition of the present invention includes one set of colloidal particles having an average size of about 2-20 nm and a second set of colloidal particles having an average size of about 15-100 nm. In yet another non-limiting specific example, the colloidal particle containing composition of the present invention contains one set of colloidal particles having an average size of about 3-15 nm and a second set of colloidal particles having an average size of about 16-50 nm. In still yet another non-limiting specific example, the colloidal particle containing composition of the present invention contains one set of colloidal particles having an average size of about 4-10 nm and a second set of colloidal particles having an average size of about 18-40 nm. As can be appreciated, other sized particles for the first and/or second set of particles can be used. As can also or alternatively be appreciated, more than two sets of colloidal particles having different average particle sizes can be included in the colloidal particle containing composition of the present invention. For instance, the colloidal particle containing composition of the present invention can include from about 2-10 sized sets of colloidal particles having different average particle sizes.

In another and/or alternative non-limiting aspect of the present invention, the colloidal particle containing material of the present invention includes at least one sized set of colloidal particles that include particles that are essentially inert or minimally reactive with a surface to which the colloidal particles are applied. Various types of colloidal particles can be used in the colloidal particle containing material of the present invention. Non-limiting examples of colloidal particles include, but are not limited to, polystyrene particles (PS), silica particles, titania particles, Ag, Au, polymethylmethacrylate particles (PMMA), polyethylene dioxythiophene (PEDOT), and/or polyaniline (PANI). As can be appreciated, other or additional types of colloidal particles can be used in colloidal particle containing material of the present invention. As can also be appreciated, the colloidal particles that are included in colloidal particle containing material of the present invention can be formed of the same or different types of material. In one non-limiting embodiment of the present invention, the colloidal particles included in the colloidal particle containing material of the present invention include silica colloidal particles. In one non-limiting aspect of this embodiment, at least one set of colloidal particles includes a majority of silica colloidal particles. In another non-limiting aspect of this embodiment, at least one set of colloidal particles includes a majority weight percent of silica colloidal particles. In still another non-limiting aspect of this embodiment, at least one set of colloidal particles includes at least about 75 weight percent of silica colloidal particles. In yet another non-limiting aspect of this embodiment, at least one set of colloidal particles includes over 90 weight percent of silica colloidal particles. In still yet another non-limiting aspect of this embodiment, at least one set of colloidal particles includes about 100 weight percent of silica colloidal particles. In another non-limiting aspect of this embodiment, at least two sets of colloidal particles include silica colloidal particles. In still another non-limiting aspect of this embodiment, at least two sets of colloidal particles include a majority weight percent of silica colloidal particles. In yet another non-limiting aspect of this embodiment, at least two sets of colloidal particles include at least about 75 weight percent of silica colloidal particles. In still yet another non-limiting aspect of this embodiment, at least two sets of colloidal particles include about 100 weight percent of silica colloidal particles.

In still another and/or alternative non-limiting aspect of the present invention, the colloidal particle containing material of the present invention includes one or more sets of colloidal particles that have been modified. The colloidal particles can be modified to 1) control the size of the colloidal particles, 2) improve the bonding between a plurality of colloidal particles when applied to a surface, 3) improve the bonding between a plurality of colloidal particles and the surface to which the colloidal particles are applied, 4) increase the packing density between a plurality of colloidal particles, and/or 5) increase the hydrophobicity of colloidal particles when applied to a surface. As can be appreciated, one or more colloidal particles can be modified for other or additional reasons. In one non-limiting embodiment of the invention, a plurality of colloidal particles are modified so as to include one or more alkyl chains. As can be appreciated, colloidal particles can be modified to include other or additional types of hydrocarbon chains (e.g., alkane chain, alkene chain, aryl chain, etc.). The hydrocarbon chains can be substituted (e.g., hydrogen substituted with a halogen, another hydrocarbon chain, etc.) or non-substituted chains. The alkyl chains, when used, are believed to increase the hydrophobicity of the modified colloidal particles. Typically, smaller colloidal particles and/or shorter alkyl chains result in improved packing of the colloidal particles, which in turn can also or alternatively increase the hydrophobicity of a coating of colloidal particle containing material of the present invention on a surface. The alkyl chains can be saturated chains or unsaturated chains. The colloidal particles in the colloidal particle containing material of the present invention can all be modified or a portion of the colloidal particles can be modified. The modified colloidal particles can be modified in the same or different way. For instance, one set of colloidal particles can include one type of hydrocarbon chain and another set of colloidal particles can include a longer and/or different type of hydrocarbon chain. The length of each of the alkyl chains on one or more colloidal particles is up to about a 30 carbon chain; however, larger lengths can be used in some applications. When the alkyl chain is too large, the alkyl chain can begin to interfere with the proper formation of the non-smooth surfaces. In another and/or alternative non-limiting embodiment, the average length of an alkyl chain on colloidal particles that have been modified to include alkyl chains is about a 1-24 carbon chain. In one non-limiting aspect of this embodiment, the length of each of the alkyl chains on one or more colloidal particles is about a 1-18 carbon chain. In another non-limiting aspect of this embodiment, the length of each of the alkyl chains on one or more colloidal particles is about a 2-16 carbon chain. In still another non-limiting aspect of this embodiment, the length of each of the alkyl chains on one or more colloidal particles is about a 3-16 carbon chain. In another yet non-limiting aspect of this embodiment, the length of each of the alkyl chains on one or more colloidal particles is about a 3-8 carbon chain. In still another and/or alternative non-limiting embodiment of the present invention, the colloidal particle containing material of the present invention includes colloidal silica particles that have been modified to include one or more hydrocarbon chains (e.g., alkyl chains, etc.). The modification of silica to include hydrocarbon chains such as alkyl chains is known in the art, thus will not be described herein.

In yet another and/or alternative non-limiting embodiment of the invention, two or more sets of colloidal particles in the colloidal particle containing material of the present invention can include different lengths and/or types of hydrocarbon chains. The different types and/or lengths of hydrocarbon chains can be used to alter the size of the modified colloidal particles. The modified size of the colloidal particles alone or in combination with the types and/or lengths of hydrocarbon chains can be used to alter the hydrophobicity of the colloidal particle containing material of the present invention. For instance, colloidal particles that are generally the same size, can be differentiated in size by modifying at least a portion of the colloidal particles by use of different types and/or lengths of hydrocarbon chains. The effect of the different sized particles can be the same or similar to when different sized colloidal particles are used as discussed above. As can be appreciated, different sized colloidal particles can also be modified by different types and/or lengths of hydrocarbon chains. In essence, the differentiated particle size of the colloidal particles can be obtained by 1) using different sized colloidal particles, 2) using the same sized colloidal particles but modifying a portion of the colloidal particles with one type and/or size hydrocarbon chain, 3) using the same sized colloidal particles but modifying a portion of the colloidal particles with one type and/or sized hydrocarbon chain and modifying another portion of the colloidal particles with a different type and/or sized hydrocarbon chain, 4) using different sized colloidal particles and modifying a portion of the colloidal particles with one type and/or sized hydrocarbon chain, or 5) using different sized colloidal particles but modifying one sized set of colloidal particles with one type and/or sized hydrocarbon chain and modifying another sized set of colloidal particles with a different type and/or sized hydrocarbon chain.

In still yet another and/or alternative non-limiting embodiment of the invention, at least a portion of the colloidal particles in the colloidal particle containing material of the present invention can be modified to include biocide, coloring agent, and/or scent agent. The biocide can be used to inhibit or prevent growth or one or more types of microorganisms. The coloring agent can be used to produce a certain color on a surface after the colloidal particle containing material of the present invention has been applied to the surface. The scent agent can be used to produce a desired scent on a surface after the colloidal particle containing material of the present invention is applied to the surface.

In another and/or alternative non-limiting aspect of the present invention, the colloidal particle containing material of the present invention can be formulated in a mixture that includes one or more solvents, propellants, biocides, coloring agents, scent agents adhesion promoters, thickeners, preservatives, UV protector agents, and the like. Generally the formulation that includes the colloidal particles includes a solvent. Different solvents can be used for different types of formulations. Non-limiting examples of solvents include, but are not limited to, water, polydimethylsiloxane (silicon fluid), mineral spirits, D4®, D5®, D6®, LPA® solvents (LPA®, LPA-142®, LPA-150®, LPA-170®, etc.), hexane, pentane, ethanol, ethylacetate, propanol, diethylether, methanol, butanol, TPA-5®, cyclopentane, and/or toluene. The solvent content generally is at least about 1 weight percent of the formulation and generally less than about 99 weigh percent of the formulation. When a biocide is used, it can be selected to at least partially inhibit, prevent, reduce or eliminate the growth of one or more undesirable organisms (e.g., bacteria, fungus, viruses, insects, etc.) that contact and/or are in close proximity to the coated surface. The biocide can thus be used to at least partially disinfect, sanitize, and/or sterilize regions on and/or about the coated surface. As used herein, the term "sanitize" shall mean the reduction of contaminants on the device surface to levels considered safe according to public health ordinances, or that reduces the bacterial population by significant numbers (e.g., at least 90%) where public health requirements have not been established. As used herein, the term "sterilize" shall mean the substantially complete elimination or destruction of all forms of microbial life. Many different types of biocides can be used in the colloidal particle containing material. Non-limiting examples of biocides that can be used include, but are not limited to, cationic biocides (e.g., biguanide compounds, quaternary ammonium salts, etc.), alcohols, peroxides, boric acid and borates, chlorinated hydrocarbons, organometallics, halogen-releasing compounds, mercury compounds, metallic salts, chitosan, hypochlorite producing agent, creosote bush particles, hemp particles, antimicrobial essential oils, pine oil, organic sulfur compounds, iodine compounds, silver nitrate, quaternary phosphate compounds, phenolics, APG, silver nano-particles, lactic acid crystals, alternate starch agglomerates, or some mixture thereof. The amount of the biocide in a particular formulation is selected to obtain the desired amount of organism prevention and/or protection. In one non-limiting embodiment of the invention, the formulation includes no more than about 10 weight percent biocide, when used, and typically about 0.01-2 weight percent biocide. As can be appreciated, other weight percentages can be used.

In still another and/or alternative non-limiting embodiment of the invention, colloidal particle containing material of the present invention can be formed into a variety of different mixtures for various types of applications. Several non-limiting applications are discussed above. In one non-limiting application of the present invention, the colloidal particle containing material of the present invention is in the form of vehicle protectant. The vehicle protectant can be formulated to be applied to the windows, mirrors, windshield and/or other glass surfaces of a vehicle to create a coating that is substantially clear and creates a sheeting effect during liquid contact (e.g., rain, car wash, etc.) and a dirt repellancy effect on the glass surface. The vehicle protectant can also or alternatively be formulated to be applied to metal surfaces, tires, plastic and/or rubber surfaces, and/or wood surfaces of a vehicle to create a coating that is substantially clear and creates a sheeting or beading effect during liquid contact, a dirt repellency effect and/or a shine on the surface. The vehicle protectant can also or alternatively be formulated to be applied to porous materials in a vehicle (e.g., fabric seats, leather seats, interior ceiling surface of the vehicle, etc.) to create a stain resistant and/or water resistant coating on the material that is substantially clear. The vehicle protectant can also or alternatively be formulated to be applied to the metal surfaces, plastic and/or rubber surfaces, and/or wood surfaces of a vehicle to create a coating that fills in scratches on the vehicle surface and which creates a sheeting or beading effect during liquid contact, a dirt repellency effect and/or a shine on the surface, and which may or may not form a colored coating. As can be appreciated, two or more types of the vehicle protectants described above can have the same or different formulation, but all of the vehicle protectant formulations include colloidal particles in accordance with the present invention. As also can be appreciated, although the formulations described above are classified as a vehicle protectant, it will be appreciated that the formulations could be used on non-vehicle surfaces, some of which have been previously identified above. Several non-limiting examples of formulations that can include colloidal particles in accordance with the present invention are set forth below:

EXAMPLE A

Protectant

| | |
|---|---|
| Solvent | 2-99 weight percent |
| Colloidal particle blend | 0.5-40 weight percent |
| Adhesion promoter | 0-20 weight percent |
| Biocide/Preservative/ Coloring Agent/Fragrance | 0-20 weight percent |
| Propellant | 0-80 weight percent |

EXAMPLE B

Protectant

| | |
|---|---|
| Solvent | 25-98 weight percent |
| Colloidal particle blend | 0.5-30 weight percent |
| Adhesion promoter | 0-10 weight percent |
| Organic solvent | 0-30 weight percent |
| Biocide/Preservative/ Coloring Agent/Fragrance | 0-10 weight percent |
| Propellant | 0-70 weight percent |

EXAMPLE C

Protectant

| | |
|---|---|
| Solvent | 60-94 weight percent |
| Colloidal particle blend | 2-10 weight percent |
| Adhesion promoter | 0-6 weight percent |
| Organic solvent | 0-5 weight percent |
| Biocide/Preservative/ Coloring Agent/Fragrance | 0-2 weight percent |

In the non-limiting examples above, the general formulations of the protectant can be formulated for a wide variety of uses. As indicated above, the formulations may or may not include an adhesion promoter, organic solvent, biocide, preservative, coloring agent, fragrance and/or propellant. The particular end use of the formulation will generally dictate the inclusion of one or more of these optional components. As can be appreciated, other or additional optional components can be included in the formulation (e.g., pH adjusters, thickeners, emulsion agents, waxes, non-solvent silicones, fluorinated polymers, alkylsilanes, alkyldisilazanes, paraffins, fatty esters, fluorinated and functionalized alkanes, colorants, etc.). The particular end use of the formulation will also generally dictate the type of solvent in the formulation. The particular end use of the formulation may further dictate whether a propellant is included in the formulation. The colloidal particle blend can include 1) different sized colloidal particles, 2) the same sized colloidal particles but at least a portion of the colloidal particles are modified with one type and/or size hydrocarbon chain, 3) the same sized colloidal particles but at least one portion of the colloidal particles are modified with one type and/or sized hydrocarbon chain and another portion of the colloidal particles are modified with a different type and/or sized hydrocarbon chain, 4) different sized colloidal particles and at least a portion of the colloidal particles are modified with one type and/or sized hydrocarbon chain, or 5) different sized colloidal particles but at least one set of sized colloidal particles are modified with one type and/or sized hydrocarbon chain and another sized set of colloidal particles are modified with a different type and/or sized hydrocarbon chain.

One non-limiting object of the present invention is the provision of a formulation that includes colloidal particles to form hydrophobic and/or self cleaning surfaces.

Another and/or alternative non-limiting object of the present invention is the provision of a formulation that includes colloidal particles that form a surface structure on an applied surface which surface structure includes elevations and depressions that are at least partially formed by colloidal particles.

Still another and/or alternative non-limiting object of the present invention is the provision of a formulation that includes colloidal particles that form a surface structure on an applied surface which surface structure includes elevations and depressions that are at least partially formed by different sized colloidal particles.

Yet another and/or alternative non-limiting object of the present invention is the provision of a formulation that includes colloidal particles to form hydrophobic and/or self cleaning surfaces at least partially by use of different sized colloidal particles.

Still yet another and/or alternative non-limiting object of the present invention is the provision of a formulation that includes colloidal particles to form hydrophobic and/or self cleaning surfaces at least partially by use of modified colloidal particles.

Another and/or alternative non-limiting object of the present invention is the provision of a formulation that includes colloidal particles to form hydrophobic and/or self cleaning surfaces at least partially by use of hydrophobically modified colloidal particles.

Still another and/or alternative non-limiting object of the present invention is the provision of a formulation that includes colloidal particles to form hydrophobic and/or self cleaning surfaces at least partially by use of different sized colloidal particles, which at least a portion of the colloidal particles are hydrophobically modified colloidal particles.

These and other objects and advantages will become apparent to those skilled in the art upon reading and following the description of the invention taken together with the accompanied drawings.

BRIEF DESCRIPTION OF THE DRAWINGS

Reference may now be made to the drawings, which illustrate various non-limiting attributes of the invention wherein.

DETAILED DESCRIPTION OF INVENTION

Figures 1, 2A, 2B:
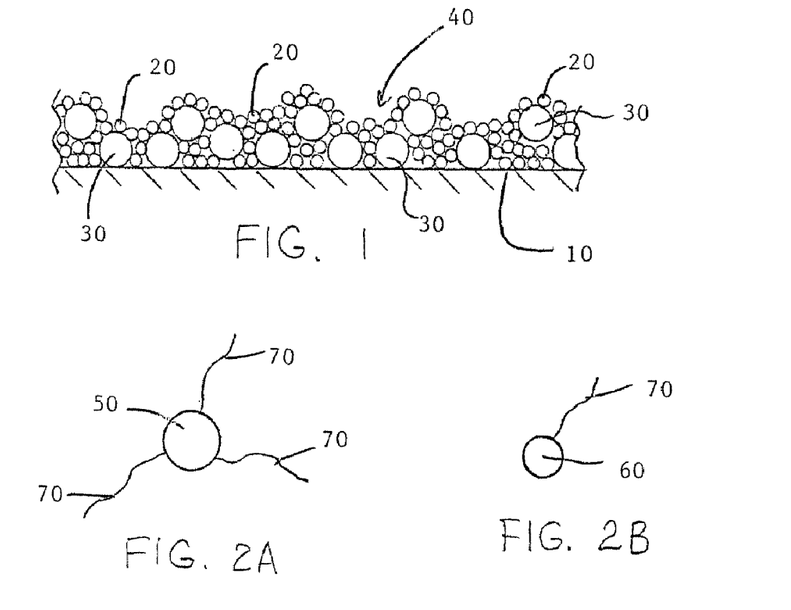
FIG. 1 illustrates a plurality of different sized colloidal particles forming a non-smooth surface coating on some type of substrate in accordance with the present invention.
FIGS. 2A and 2B illustrate modified colloidal particles that include one or more hydrocarbon chains in accordance with the present invention.

Referring now to the drawings wherein the showing is for the purpose of illustrating preferred embodiments of the invention only and not for the purpose of limiting the same, FIG. 1 illustrates a plurality of colloidal particles in the surface of some type of surface 10. The type of surface 10 is non-limiting to the present invention. For purposes of illustration only, surface 10 will be periodically referred to some surface on a vehicle; however, it will be appreciated, that surface 10 can be many other types of surfaces. The colloidal particles are illustrated as two different sized sets of colloidal particles, 20, 30. As can be appreciated, more than two different sized sets of colloidal particles can be coated on surface 10. Generally the smaller sized set of colloidal particles 20 have a particle size of about 1-10 nm and the larger sized set of colloidal particles 30 have a particle size of about 10-40 nm. These size ranges of colloidal particles are small enough to result in a substantially clear or transparent coating 40 of colloidal particles on surface 10. As can be appreciated, larger and/or small sized colloidal particles can be used for colloidal particles 20, 30. As can also be appreciated, coating 40 does not have to be a substantially clear or transparent coating. The colloidal particles are illustrated as generally spherical in shape; however, it will be appreciated that the particles can be other or additional shapes. The size ratio of the larger sized colloidal particles 30 to the smaller sized colloidal particles 20 is generally at least about 2:1; however, other size ratios can be used. If more than two different sized sets of colloidal particles are included in coating 40, the size ratio between the various sets of colloidal particles is typically different. The number of smaller sized colloidal particles 20 is generally greater than the number of larger sized colloidal particles 30. If more than two different sized sets of colloidal particles are included in coating 40, then at least the number of one set of smaller sized colloidal particles is greater than at least one set of larger sized colloidal particles. The particle number ratio of the number of at least one set of smaller sized colloidal particles 20 to at least one set of larger sized colloidal particles 30 is at least about 10:1; however, other particle number ratios can be used. FIG. 1 illustrates that there is essentially a single layer of larger sized colloidal particles 30 that are at least partially surrounded by one or more layers of smaller sized colloidal particles 20. As can be appreciated, coating 40 can be formed of multiple layers of larger sized colloidal particles 30 in combination with many more layers of smaller sized colloidal particles 20. The single layer of larger sized colloidal particles 30 set forth in FIG. 1 is merely for illustrative purposes. The composition of colloidal particles 20, 30 can be the same or different. One non-limiting type of colloidal particle that can be used in the present invention is a silica colloidal particle.

Referring again to FIG. 1, the two sets of colloidal particles 20, 30 form a non-smooth surface coating 40 on the top of the substrate 10. The non-smooth surface is formed of peaks and valleys. The average height between the plurality of peaks and valleys in coating 40 is at least about 3 nm; however, other heights in the coating can be formed. These small peaks and valleys formed in coating 40 can facilitate in creating a lotus type effect on the surface of the coating. This lotus type effect can result in liquids such as water to runoff the coating surface and/or bead on the coating surface, thereby at least partially inhibiting such liquids from contacting substrate 10 and/or from being absorbed into substrate 10.

Referring now to FIGS. 2A and 2B, there is illustrated a colloidal particle 50, 60 that has been modified by one or more hydrocarbon chains 70. As can be appreciated, one or more chains 70 do not have to be a hydrocarbon chain. When the colloidal particle includes a plurality of chains 70, the chains can have the same or different size and/or composition. The inclusion of one or more hydrocarbon chains on the colloidal particles can be used to increase the hydrophobicity of the colloidal particles. Many different types of hydrocarbon chains can be included on the colloidal particles. One non-limiting hydrocarbon chain is an alkyl chain. When alkyl chains are used, the length of the alkyl chain is about 1-10 carbons; however, other lengths can be used. As illustrated in FIG. 2A, colloidal particle 50 includes three chains 70, which chains can be hydrocarbon chains such as an alkyl chain. The three alkyl chains can have the same or different number of carbon atoms in the chain.

Figure 3:
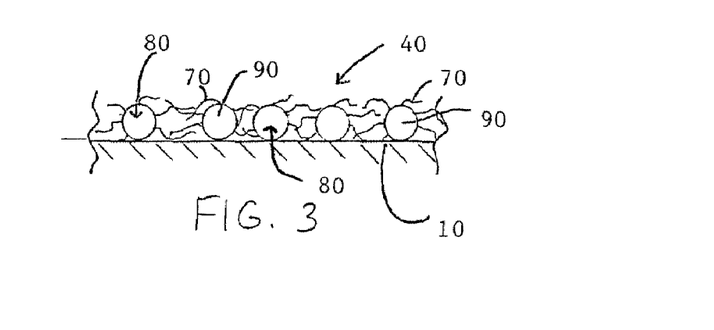
FIG. 3 illustrates a plurality of modified colloidal particles forming a hydrophobic surface coating on some type of substrate in accordance with the present invention; and, FIG. 4 illustrates a plurality of different sized modified colloidal particles forming a non-smooth surface coating on some type of substrate in accordance with the present invention.
Figure 4:
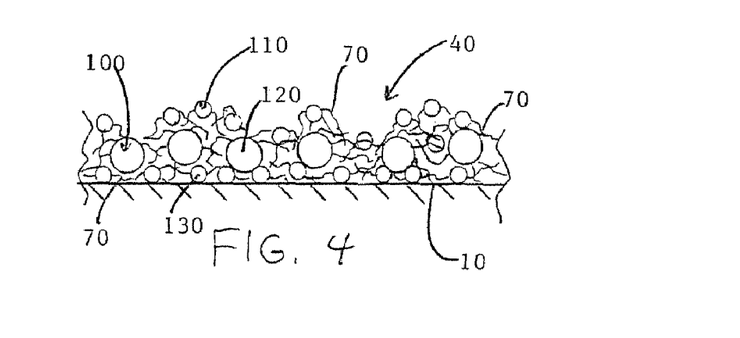

Referring now to FIGS. 3 and 4, there are illustrated two different coatings 40 of colloidal particles on surface 10. In FIG. 3, the colloidal particles are modified colloidal particles 80 which are the same as or similar to the modified colloidal particles illustrated in FIGS. 2A and 2B. The modified colloidal particles 80 are shown to have generally the same size of core particle 90 and have one or more chains 70 secured to the core particle. The chains 70 on the modified colloidal particles create an increased density in the coating formed by the modified colloidal particles 80. This denser assembly of modified colloidal particles 80 can be used to increase the hardness and/or durability of coating 40, increase the hydrophobicity of coating 40, increase the bonding strength of the modified colloidal particles 80 to one another and/or to the surface of substrate 10, etc.

Referring now to FIG. 4, coating 40 is formed by two sets of modified colloidal particles 100, 110 which form a non-smooth surface coating 40 on the top of the substrate 10. The non-smooth surface coating 40 is formed of peaks and valleys. The average height between the plurality of peaks and valleys in coating 40 is at least about 3 nm; however, other heights in the coating can be formed. Similar to the non-smooth coating illustrated in FIG. 1, the plurality of small peaks and valleys formed in coating 40 can facilitate in creating a lotus type effect on the surface of the coating. The chains 70 on the modified colloidal particles create an increased density in the coating formed by the modified colloidal particles 100, 110. This denser assembly of modified colloidal particles can be used to increase the hardness and/or durability of coating 40, increase the hydrophobicity of coating 40, increase the bonding strength of the modified colloidal particles 100, 110 to one another and/or to the surface of substrate 10, etc. The modified colloidal particles 100, 110 are shown to have different sized core particles 120, 130 and have one or more chains 70 secured to the core particles. The size and particle distribution of modified colloidal particles 100, 110 can be the same or similar to the size and particle distribution of colloidal particles 20, 30 illustrated in FIG. 1.

A composition comprising a two or more sets of modified colloidal particles is provided, wherein the colloidal particles form a non-smooth surface coating on a substrate surface at least after the composition has been applied to the substrate and has substantially dried or set. The composition includes at least a first and a second set of colloidal particles, each of said first and second sets of colloidal particles including a plurality of colloidal particles, each having an average size of colloidal particles. In each of the first and second sets of colloidal particles, the average particle size of the first set of colloidal particles is greater than the average particle size of said second set of colloidal particles. Moreover, the composition includes a greater number of colloidal particles in the second set of colloidal particles than the number of colloidal particles in the first set of colloidal particles. In one embodiment, the ratio of average particle sizes between the first set of colloidal particles and the second set of colloidal particles is at least about 1.1:1. In another preferred embodiment, the ratio the average particle size of the first set of colloidal particles to the average particle size of the second set of colloidal particles is at least about 1.5-20:1. In a further embodiment, the composition comprises a ratio of the number of colloidal particles of the second set of colloidal particles to the number of particles of the first set of colloidal particles is at least about 2:1. In another embodiment, the composition comprises a ratio of the number of colloidal particles of the second set of colloidal particles to the number of particles of the first set of colloidal particles is about 10-1000:1. In another embodiment of the invention, the average particle size of the first set of colloidal particles is about 15-2000 nm, and the average particle size of the second set of colloidal particles is about 1-200 nm. In a further embodiment, the average particle size of the first set of colloidal particles is about 15-200 nm, and the average particle size of the second set of colloidal particles is about 1-40 nm.

A composition comprising a two or more sets of modified colloidal particles is provided, wherein the colloidal particles form a non-smooth surface coating on a substrate surface at least after the composition has been applied to the substrate and has substantially dried or set. In one preferred embodiment, the colloidal particles of the first and second set of colloidal particles includes particles selected from the group consisting essentially of polystyrene, silica, titania, Ag, Au, polymethylmethacrylate, polyethylene dioxythiophene, polyaniline, or combinations thereof. In a more preferred embodiment of the composition, a majority of the colloidal particles of the first and second set of colloidal particles include silica particles. In yet another embodiment, at least a portion of the colloidal particles in the first set of colloidal particles, the second set of colloidal particles, or combinations thereof includes modified colloidal particles, said modified colloidal particles including at least one hydrocarbon chain. Moreover, in a further embodiment, at least one of the at least one hydrocarbon chains is an alkyl chain having 1-24 carbon atoms. Additionally, it is envisioned that differing hydrocarbon chains may be used on the colloidal particles. For instance, at least one hydrocarbon chain on at least one colloidal particle is a different type of hydrocarbon chain, different size of hydrocarbon chain, or combinations thereof from at least one hydrocarbon chain on at least one other colloidal particle.

The non-smooth surface coating that is formed when the composition is applied to the substrate surface includes valleys and peaks. The non-smooth surface coating results in an average height between the valley and peaks of about 1-1500 nm. In another embodiment, the non-smooth surface on the substrate surface includes valleys and peaks having an average height between the valley and peaks of about 2-100 nm.

It is also envisioned to provide a method for forming a hydrophobic coating on a substrate by providing a formulation that includes a solvent and a first and second set of colloidal particles. Each of the first and second sets of colloidal particles includes a plurality of colloidal particles, and the average particle size of each of the first and second sets of colloidal particles are such that the average particle size of the first set of colloidal particles is greater than the average particle size of the second set of particles. Further, the composition if formulated such that the second set of colloidal particles comprises a greater number of colloidal particles than the number of colloidal particles in the first set of colloidal particles. The hydrophobic coating is then applied to the surface of a substrate and is allowed to at least partially set or dry on said surface of said substrate. In this regard, the formulation creates a non-smooth coating on the surface of the substrate that is formed by the at least first and second sets of colloidal particles.

Functionalizing of Silica

In one embodiment of the invention, colloidal silica in methanol from Nissan Chemical Industries, Ltd. was used for the functionalization of colloidal silica. The purpose of the methanolic solutions is to reduce the amount of water in the system that can react with the reactive silane coupling agents. In a typical reaction, 25 grams of colloidal silica is added to a three-neck round-bottom flask and heated with a heating mantle. To this solution is added 50 milliliters of toluene mixed with 2 milliliters of a silane coupling agent with rapid stirring and continued heating. The reaction is refluxed from 12-24 hours. After refluxing for 12-24 hours, the reaction mixture is cooled to room temperature and the functionalized colloidal silica is isolated from solution by addition of another organic solvent and centrifuge. The collected gel is washed with an organic solvent to remove any remaining free silane coupling agents. The gel is then dispersed in the desired organic solvent with heat and the remaining organic solvents with lower boiling points are removed by distillation using a Dean-Starke trap to collect the distillate.

In another embodiment of the invention, 25 milliliters of MT-ST (10-15 nm colloidal silica in methanol, 30-31 weight % $SiO_2$, <2% water, Nissan Chemical Industries, Ltd) is heated in a three-neck round-bottom flask and 50 milliliters of toluene mixed with 2 milliliters of methyltrimethoxysilane (MTMSi) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted MTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In another embodiment of the invention, 25 milliliters of MA-ST-S (7-9 nm colloidal silica in methanol, 20 weight % $SiO_2$, Nissan Chemical Industries, Ltd) is heated in a three-neck round-bottom flask and 50 milliliters of toluene mixed with 2 milliliters of propyltrimethoxysilane (PTMSi) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted PTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In another embodiment of the invention, 25 milliliters of MA-ST-M (18-22 nm colloidal silica in methanol, 40 weight % $SiO_2$, Nissan Chemical Industries, Ltd) is heated in a three-neck round-bottom flask and 50 milliliters of toluene mixed with 2 milliliters of octyltrimethoxysilane (OTMSi) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted OTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In another embodiment of the invention, 20 milliliters of MA-ST-S (7-9 nm colloidal silica in methanol, 20 weight % $SiO_2$, Nissan Chemical Industries, Ltd) is mixed with 5 milliliters of MA-ST-M (18-22 nm colloidal silica in methanol, 40 weight % $SiO_2$, Nissan Chemical Industries, Ltd) and heated in a three-neck round-bottom flask and 50 milliliters of toluene mixed with 2 milliliters of propyltrimethoxysilane (PTMSi) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted PTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, vis-cous liquid that, when applied to a surface and dried, produces a super hydrophobic surface coating that resists liquids and prevents staining.

In another embodiment of the invention, 25 milliliters of MT-ST (10-15 nm colloidal silica in methanol, 30-31 weight % $SiO_2$, <2% water, Nissan Chemical Industries, Ltd) is heated in a three-neck round-bottom flask and 50 milliliters of toluene mixed with 2 milliliters of octadecyltrimethoxysilane (ODTMSi) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted ODTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In another embodiment of the invention, 25 milliliters of MA-ST-S (7-9 nm colloidal silica in methanol, 20 weight % $SiO_2$, Nissan Chemical Industries, Ltd) is heated in a three-neck round-bottom flask and 50 milliliters of toluene mixed with 2 milliliters of hexamethyldisiloxane (HMDS) is added with rapid stirring and refluxed overnight. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted HMDS and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In another embodiment of the invention, 25 milliliters of MT-ST (10-15 nm colloidal silica in methanol, 30-31 weight % $SiO_2$, <2% water, Nissan Chemical Industries, Ltd) is heated in a three-neck round-bottom flask and 50 milliliters of toluene mixed with 2 milliliters of propyltrimethoxysilane (PTMSi) is added with rapid stirring and refluxed for 12 hours. Afterwards 1 milliliter of trimethylmethoxysilane (TMMSi) is added to react with the remaining free hydroxyl groups on the surface of the silica and refluxed for an additional 12 hours. Afterwards the reaction solution is cooled to room temperature resulting in an opalescent liquid over an opalescent gel. The reacted colloidal silica is isolated from the reaction solution by addition of acetone to the liquid or by washing the gel with acetone and centrifuging the mixture. The resulting gel can be washed again with acetone to remove any remaining unreacted MTMSi and centrifuged again. The organic solvents are decanted from the remaining gel and the gel is dispersed in an LPA solvent with mixing and heating. Any remaining acetone, methanol and toluene are removed by distillation with a light vacuum being applied to remove the toluene when needed. This results in an optically clear, viscous liquid that, when applied to a surface and dried, produces a super hydrophobic surface coating that resists liquids and prevents staining.

In other embodiments of this invention the corresponding chloro- or ethoxysilane coupling agents can be used. Examples include octyltrichlorosilane, propyltrichlorosilane, hexadecyltrichlorosilane, and octyltriethoxysilane. Other examples of silane coupling agents that can be used include trimethylmethoxysilane, dimethyl-propyl-chlorosilane, chlorodimethylphenylsilane, hexamethyldisilazane, 3-(Trimethoxysilyl)propyl methacrylate, Chloro-dimethyl-octadecylsilane, Chlorotriethylsilane, Chlorotriisopropylsilane, Chlorotrimethylsilane, Dichloro(chloromethyl)-methylsilane, Dichloro-methyl-octadecylsilane, Dichlorodimethylsilane, Dimethoxymethyl-octadecylsilane, Trichloro(chloromethyl)silane, (3-Aminopropyl)triethoxysilane, 1H,1H,2H,2H-Perfluorooctyltriethoxysilane, 3-Cyanopropyltrichlorosilane, Chloro-dimethyl(3,3,3-trifluoropropyl)silane, Chloro(dimethyl)thexylsilane, Chlorodimethyl(2,3,4,5-tetramethyl-2,4-cyclopentadien-1-yl)silane, Chlorodimethyl(pentafluorophenyl)silane, Chlorodimethylphenethylsilane, Chloromethyl(dimethyl)silane, (Chloromethyl)methylbis(pentafluorophenyl)silane, Chlorotris(1,3-dimethylbutoxy)silane, Chlorotris(trimethylsilyl)silane, Dichloromethyl-octylsilane, Dichloromethyl(2-phenethyl)silane, Diisopropyl(3,3,4,4,5,5,6,6,6-nonafluorohexyl)silane, Diisopropyl(3,3,4,4,5,5,6,6,7,7,8,8,8-tridecafluorooctyl)-silane, Diisopropyl(3,3,4,4,5,5,6,6,7,7,8,8,9,9,10,10,10-heptadecafluorodecyl)silane, Dimethoxymethyl(3,3,3-trifluoropropyl)silane, Ethyltrichlorosilane, Isobutyl(tri-methoxy)silane, Methyltrichlorosilane, Methyltris(tri-sec-butoxysilyloxy)silane, Phenyl-tris(trimethylsiloxy)silane, tert-Butyldimethyl(2-propynyloxy)silane, Triacetoxy(methyl)silane, Triacetoxy(vinyl)silane, Trichloro(1H,1H,2H,2H-perfluorooctyl)silane, Trichloro-(2-chloroethyl)silane, Trichloro[2-(chloromethyl)-allyl]silane, Trichloro(2-cyanoethyl)silane, Trichloro(3,3,3-trifluoropropyl)silane, Trichloro(3,3,4,4,5,5,6,6,7,7,8,8,8-tridecafluorooctyl)silane, Trichloro(3-chloropropyl)silane, Trichloro(3-cyanopropyl)silane, Trichloro(4-chlorophenyl)silane, Trichloro(dichloromethyl)silane, Trichloro(hexyl)silane, Trichloro(isobutyl)silane, Trichloro(octadecyl)silane, Trichloro(octyl)silane, Trichloro(phenethyl)silane, Trichloro(phenyl)silane, Trichloro(propyl)silane, Triethoxy(1-phenylethenyl)silane, Triethoxy(3-isocyanatopropyl)silane, Triethoxy(4-methoxyphenyl)silane, Triethoxy(4-(trifluoromethyl)phenyl)silane, Triethoxy(ethyl)silane, Triethoxy-(isobutyl)silane, Triethoxy(octyl)silane, Trimethoxy(2-phenylethyl)silane, Trimethoxy(3,3,3-trifluoropropyl)silane, Trimethoxy[3-(methylamino)propyl]silane, Trimethoxy[3-(phenylamino) propyl]silane, Trimethoxy(7-octen-1-yl)silane, Trimethoxy(octadecyl)silane, Trimethoxy(octadecyl)silane, Trimethoxy(propyl)-silane, Trimethoxy(vinyl)silane, Vinyltrimethoxysilane, Trimethoxy[2-(7-oxabicyclo[4.1.0]hept-3-yl)ethyl]silane, Chlorodiphenyl(diphenylmethyl)silane, Chloromethyl-triethyl-silane, Chloromethyldimethyl(pentachlorophenyl)silane, Chlorotri(2-biphenylyl)silane, Chlorotri(O-tolyl)silane, Chlorotris(1-Naphthyl)silane, Chlorotris(2-Methoxyphenyl)silane.

As stated above, the colloidal particle system of the present invention can be used in many different formulations. Several non-limiting formulations that can be used on vehicles are set forth below.

Example 1

Wheel Protectant

| | |
|---|---|
| Silicon fluid | 25-98 weight percent |
| Colloidal particle blend | 0.5-30 weight percent |
| Adhesion promoter | 0-10 weight percent |
| Organic solvent | 0-30 weight percent |
| Biocide/Preservative/ Coloring Agent/Fragrance | 0-10 weight percent |
| Propellant | 0-70 weight percent |

Example 2

Wheel Protectant

| | |
|---|---|
| Silicon fluid | 60-94 weight percent |
| Colloidal particle blend | 2-10 weight percent |
| Adhesion promoter | 0-6 weight percent |
| Organic solvent | 0-5 weight percent |
| Biocide/Preservative/ Coloring Agent/Fragrance | 0-2 weight percent |

Example 3

Wheel Protectant

| | |
|---|---|
| Silicon fluid | 30-50 weight percent |
| Colloidal particle blend | 1-6 weight percent |
| Adhesion promoter | 0-4 weight percent |
| Organic solvent | 0-3 weight percent |
| Biocide/Preservative/ Coloring Agent/Fragrance | 0-1 weight percent |
| Propellant | 40-60 weight percent |

Example 4

Wheel Protectant

| | |
|---|---|
| Decamethylcyclopentasiloxane silicon fluid | 70-90 weight percent |
| Colloidal silica (7-9 nm) | 5-14 weight percent |
| Colloidal silica (14-26 nm) | 1-4 weight percent |
| Triethoxyoctylsilane | 2-6 weight percent |
| Organic paraffinic solvent | 0-5 weight percent |
| Biocide/Preservative/ Coloring Agent/Fragrance | 0-1 weight percent |

Example 5

Wheel Protectant

| | |
|---|---|
| Decamethylcyclopentasiloxane silicon fluid | 70-90 weight percent |
| Hydrophobically Modified colloidal silica (7-9 nm) | 5-14 weight percent |
| Hydrophobically Modified colloidal silica (14-26 nm) | 1-4 weight percent |
| Triethoxyoctlysilane | 2-6 weight percent |
| Organic paraffinic solvent | 0-5 weight percent |
| Biocide/Preservative/ Coloring Agent/Fragrance | 0-1 weight percent |

Example 6

Wheel Protectant

| | |
|---|---|
| Decamethylcyclopentasiloxane silicon fluid | 35-45 weight percent |
| Colloidal silica (7-9 nm) | 2-7 weight percent |
| Colloidal silica (14-26 nm) | 0.5-2 weight percent |
| Triethoxyoctlysilane | 1-3 weight percent |
| Organic paraffinic solvent | 0-3 weight percent |
| Biocide/Preservative/ Coloring Agent/Fragrance | 0-1 weight percent |
| Propellant (A-46 ®) | 40-60 weight percent |

Example 7

Wheel Protectant

| | |
|---|---|
| Decamethylcyclopentasiloxane silicon fluid | 35-45 weight percent |
| Hydrophobically Modified colloidal silica (7-9 nm) | 2-7 weight percent |
| Hydrophobically Modified colloidal silica (14-26 nm) | 0.5-2 weight percent |
| Triethoxyoctlysilane | 1-3 weight percent |
| Organic paraffinic solvent | 0-3 weight percent |
| Biocide/Preservative/ Coloring Agent/Fragrance | 0-1 weight percent |
| Propellant (A-46 ®) | 40-60 weight percent |

The wheel protectants set forth in Examples 1-7 are used to create a glossy finish on tire and other plastic or rubber surfaces. The glossy finish also creates a generally hydrophobic finish that causes water to bead and run off the tire surface. The generally hydrophobic finish can be used to 1) create a more attractive and "new" look for the tire, 2) resist dirt and/or grime build-up on the tire, and/or 3) increase the ease with which the tire can be cleaned. The wheel protectant can be designed to be applied by an aerosol to the tire surface, be sprayed on in liquid form, be applied to the tire by applicator (e.g., sponge, rag, etc.) or squirted onto the tire in a liquid or paste form. The colloidal particles used in the formulations of Examples 1 and 2 can be any colloidal particle that is non-reactive to a plastic or rubber surface. As set forth in Examples 3-7, the colloidal particles are silica particles. The modified colloidal silica particles set forth in Examples 5 and 7 generally include one or more alkyl chains having about 1-16 carbon atoms per chain. The ratio of the number of smaller colloidal silica particles to the number of larger colloidal silica particles as set forth in Examples 4-7 is about 75-125:1. The size ratio of the larger colloidal silica particles to the smaller colloidal silica particles as set forth in Examples 1-7 is about 5-7:1. After the formulations in Examples 1-7 have been applied to the tire or other vehicle surface, a coating that includes colloidal particles at least partially dries and/or at least partially becomes set on the tire or other vehicle surface. The formed coating has a non-smooth surface, which non-smooth surface can be similar to a non-smooth surface on a lotus leaf. The non-smooth surface has small peaks and valleys that have an average height between the plurality of peaks and valleys of at least about 3 nm. In yet another embodiment, the non-smooth surface has peaks and valleys having an average height between the peaks and valleys of at least 4 mm.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A composition formulated to form a non-smooth surface coating on a substrate surface at least after the composition has been applied to the substrate and has substantially dried or set, said composition including a first and second set of colloidal particles, each of said first and second sets of colloidal particles including a plurality of colloidal particles, each of said first and second sets of colloidal particles having an average particle size of colloidal particles, said first set of colloidal particles having an average particle size that is greater than said average size of said second set of particles, said composition including a greater number of colloidal particles in said second set of colloidal particles than a number of colloidal particles in said first set of colloidal particles; wherein the composition comprises:

| | |
|---|---|
| a) Silicon fluid | 25-98 weight percent; |
| b) Colloidal silica; and | |
| c) Colloidal silica (14-26). | |

2. The composition as defined in claim 1, wherein a size ratio of said average particle size of said first set of colloidal particles to said average particle size of said second set of colloidal particles is at least about 1.1:1.

3. The composition as defined in claim 1, wherein said size ratio of said average particle size of said first set of colloidal particles to said average particle size of said second set of colloidal particles is at least about 1.5-20:1.

4. The composition as defined in claim 1, wherein a number ratio of said number colloidal particles of said second set of colloidal particles to said number of particles of said first set of colloidal particles is at least about 2:1.

5. The composition as defined in claim 4, wherein said number ratio of said number colloidal particles of said second set of colloidal particles to said number of particles of said first set of colloidal particles is about 10-1000:1.

6. The composition as defined in claim 1, wherein said formed non-smooth surface on the substrate surface includes valleys and peaks and an average height between the valley and peaks of about 1-1500 nm.

7. The composition as defined in claim 5, wherein said formed non-smooth surface on the substrate surface includes valleys and peaks and an average height between the valley and peaks of about 2-100 nm.

8. The composition as defined in claim 1, wherein at least a portion of said colloidal particles in said first set of colloidal particles, said second set of colloidal particles, or combinations thereof includes modified colloidal particles, said modified colloidal particles including at least one hydrocarbon chain.

9. The composition as defined in claim 8, wherein at least one of said hydrocarbon chains is an alkyl chain having 1-24 carbon atoms.

10. A composition formulated to form a non-smooth surface coating on a substrate surface at least after the composition has been applied to the substrate and has substantially dried or set, said composition including a first and second set of colloidal particles, each of said first and second sets of colloidal particles including a plurality of colloidal particles, each of said first and second sets of colloidal particles having an average particle size of colloidal particles, said first set of colloidal particles having an average particle size that is greater than said average size of said second set of particles, said composition including a greater number of colloidal particles in said second set of colloidal particles than a number of colloidal particles in said first set of colloidal particles; wherein the composition comprises:

| | |
|---|---|
| a) Decamethylcyclopentasiloxane silicon fluid | 70-90 weight percent; |
| b) Colloidal silica (7-9 nm) | 5-14 weight percent; |
| c) Colloidal silica (14-26 nm) | 1-4 weight percent; |
| d) Triethoxyoctlysilane | 2-6 weight percent; |
| e) Organic paraffinic solvent | 0-5 weight percent; and |
| f) Biocide/Preservative/ Coloring Agent/Fragrance | 0-1 weight percent. |

11. The composition as defined in claim 10, comprising: said colloidal silica (7-9 nm) which is hydrophobically modified and said colloidal silica (14-26 nm) which is hydrophobically modified.

12. A composition formulated to form a non-smooth surface coating on a substrate surface at least after the composition has been applied to the substrate and has substantially dried or set, said composition including a first and second set of colloidal particles, each of said first and second sets of colloidal particles including a plurality of colloidal particles, each of said first and second sets of colloidal particles having an average particle size of colloidal particles, said first set of colloidal particles having an average particle size that is greater than said average size of said second set of particles, said composition including a greater number of colloidal particles in said second set of colloidal particles than a number of colloidal particles in said first set of colloidal particles; wherein the composition comprises:

| | |
|---|---|
| a) Decamethylcyclopentasiloxane silicon fluid | 35-45 weight percent; |
| b) Colloidal silica (7-9 nm) | 2-7 weight percent; |
| c) Colloidal silica (14-26 nm) | 0.5-2 weight percent; |
| d) Triethoxyoctlysilane | 1-3 weight percent; |
| e) Organic paraffinic solvent | 0-3 weight percent; |
| f) Biocide/Preservative/ Coloring Agent/Fragrance | 0-1 weight percent; and |
| g) Propellant | 40-60 weight percent. |

* * * * *